United States Patent
Stahs

(10) Patent No.: US 7,138,780 B2
(45) Date of Patent: Nov. 21, 2006

(54) PROCESS FOR THE CONTROL OF THE POSITION OF WORKPIECE AND TOOL WITH A ROBOT IN A PRODUCTION MACHINE

(75) Inventor: Thomas Stahs, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/289,988

(22) Filed: Nov. 30, 2005

(65) Prior Publication Data

US 2006/0113945 A1 Jun. 1, 2006

(30) Foreign Application Priority Data

Nov. 30, 2004 (DE) .................. 10 2004 057 814

(51) Int. Cl.
*B25J 9/18* (2006.01)
(52) U.S. Cl. ................ 318/568.11; 318/599; 318/569; 318/595; 318/571
(58) Field of Classification Search ........... 318/568.11, 318/375, 380, 68, 560, 563, 569, 571, 595, 318/599, 605, 625; 369/474.02
See application file for complete search history.

(56) References Cited

U.S. PATENT DOCUMENTS 5,814,956 A * 9/1998 Kono et al. ................. 318/380

6,923,103 B1 * 8/2005 Graf ............................ 83/530
2003/0145449 A1 8/2003 Lutz

FOREIGN PATENT DOCUMENTS

EP 1 321 225 A2 6/2003

* cited by examiner

*Primary Examiner*—Karen Masih
(74) *Attorney, Agent, or Firm*—Akerman Senterfitt; Stephan A. Pendorf; Yonghong Chen

(57) ABSTRACT

The invention relates to a process for the control of the position of workpiece and tool with a robot in a production machine. The objective of the invention is to reduce non-productive secondary processing time during the processing or measuring of a workpiece with a robot. The invention consists of a process for the control of the position of workpiece and tool with a robot in a production machine in which the workpiece (10) is positioned relative to the tool (1), (2) and during a continuous movement of the workpiece (10) with a tool (1), (2) at the processing location of the workpiece (10) a process takes place, and the tool (1), (2) is moving during the process synchronously to and in the same direction like the workpiece (10) and during the continuous movement of the workpiece (10) the tool (1), (2) is moved to and positioned in another processing location.

5 Claims, 2 Drawing Sheets

PROCESS FOR THE CONTROL OF THE POSITION OF WORKPIECE AND TOOL WITH A ROBOT IN A PRODUCTION MACHINE

BACKGROUND OF THE INVENTION

1. Field of the Invention

The invention relates to a process for controlling of the positioning of workpiece and tool with a robot in a production machine.

2. Related Art of the Invention

In DE 101 25 445 A1 a process for the control of the motion of a robot is disclosed in which faster cycle times are achieved by limiting the maximum axis speed only for the conditions where in fact a kinetic energy would result which is too high. Thus, a workpiece carried by a robot grip can be moved faster into its processing position.

DE 102 29 293 A1 discloses a process for the determination of the orientation of a robot axis with respect to a robot coordinate system in which the expenditure of time is reduced by a coordinate measurement device which is located outside of the robot system and which acquires and processes the coordinates of reference points at two different moving positions of the robot.

In a production machine, especially a milling machine according to DE 199 30 287 A1, the mobility of the whole machine is optimized by holding a tool in two opposing articulating arms and positioning the tool is under restricted freedom of movement in real time with respect to a workpiece. While moving the tool between the articulating arms the forces are carried with a favorable angle predominantly by the arm which is closer to the tool such that for the precision and load unfavorable fully extracted positions like in simpler robot joint constructions are counteracted by the opposing articulating arms. Since the machine has a restricted freedom of movement it is of limited use for three-dimensional processing.

In a system according to EP 1321225 A2 the working axis are distributed between the moving direction of the tool spindle and the moving direction of the tool, i.e. one axis which otherwise would be assigned to the spindle is eliminated. The tool spindle moves according to the movement of the workpiece to reduce the constructive complexity for the movability of the tool spindle.

For the known machining processes in which a tool or a workpiece is positioned by a robot the positioning takes longer than the actual processing or machining. In robot supported joining methods like spot welding, clinching or punch riveting, the positioning time is typically between 1 s and 1.5 s whereas the joining process itself is finished after 0.2 s to 0.8 s.

SUMMARY OF THE INVENTION

The objective of the invention is to reduce non-productive secondary processing time during the processing or measuring of a workpiece with a robot.

The objective is accomplished by a process according to the present invention Advantageous embodiments are described in the dependent claims.

During processing, while the robot moves with a workpiece or, as the case may be, with a tool in a robot gripper or a chuck and by a tool or, as the case may be, workpiece, moving simultaneously along outside of the robot, time consuming start-stop-sequences of the robot are avoided. This results in the desired reduction of secondary processing time. For this, a controller is used which coordinates the movements of workpiece and tool as well as the process steps at the workpiece. In case the workpiece is positioned with a robot and the tool is positioned with a linear drive external to the robot, then the tool's moving speed for re-positioning to the next process location is fast in comparison to the robot movement.

The invention provides a significant acceleration of conventional joining methods between two workpieces. For instance, for clinching an increase from one joining spot per second to two to three joining spots per second can be achieved. During the bodyshell work of car bodies and automotive parts faster process flows result in cost advantages, because in total less work cells for the joining process are necessary.

During processing of large workpieces the process can be implemented with cooperating robots. Processing in the sense of the invention are all the form or the dimensions of a workpiece changing work-steps as well as joining methods for two or more workpieces as well as execution of measurements on a workpiece or an assembly. During the execution of measurements the workpiece or the assembly is the measurement object and the tool is the measuring device.

BRIEF DESCRIPTION OF THE DRAWINGS

The invention is explained in more detail by way of example with one embodiment and the following illustrations. They show.

DETAILED DESCRIPTION OF THE INVENTION

Figure 1:
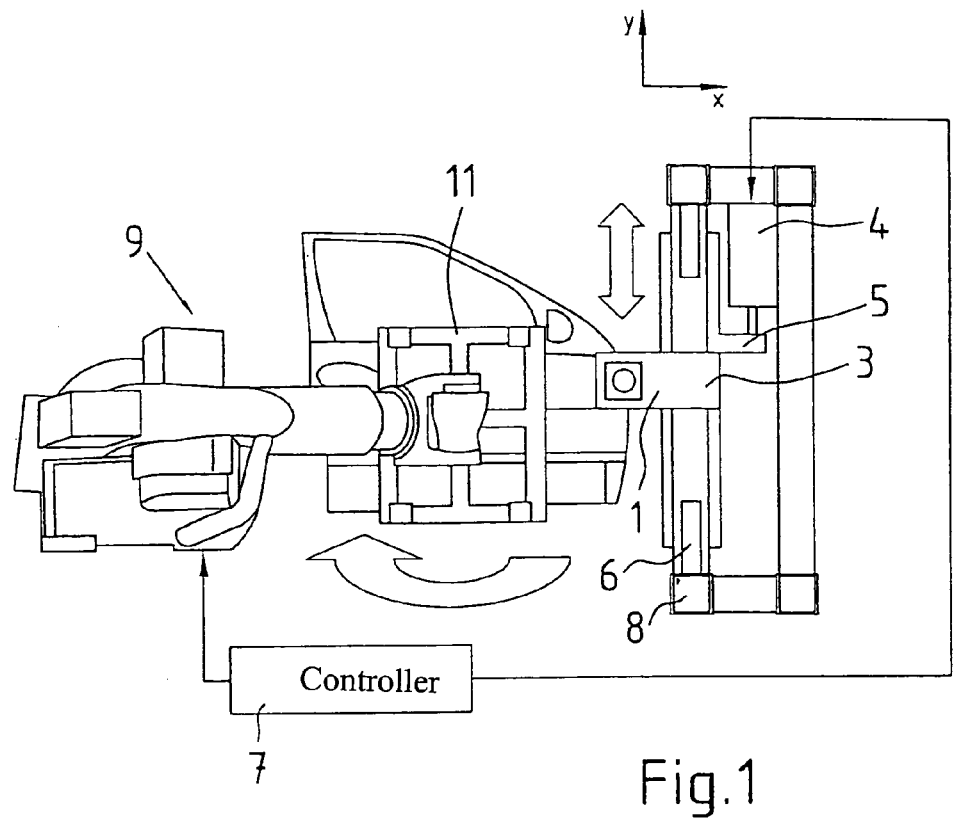
FIG. 1 top view of an apparatus for clinching.
Figure 2:
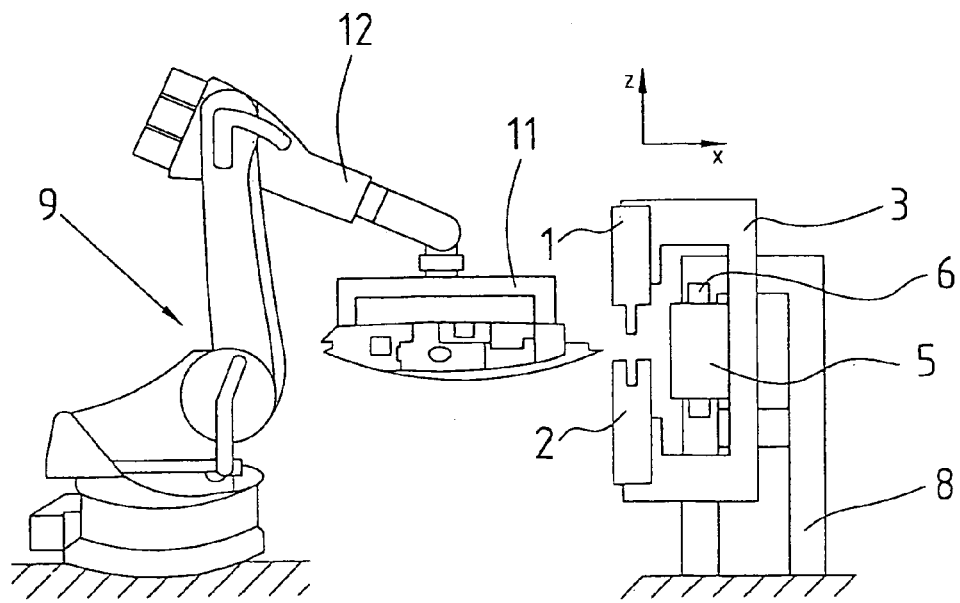
FIG. 2 side view of the device according to FIG. 1.

According to FIG. 1 and FIG. 2 the apparatus for clinching features a punch 1 and a die 2, which are mounted opposing to each other on a carriage 3. According to the commands of a controller 7 the carriage 3 can be positioned in horizontal direction y within a frame 8 by means of a motor 4, gear elements 5 and guiding elements 6. By means of an additional drive punch 1 and die 2 they can be moved towards each other in vertical direction z. Alongside the apparatus for clinching, a robot 9 is located to feed the apparatus with an automobile door 10. The robot 9 is also connected to the controller 7. On the automobile door 10 a sheet metal part ought to be joined by clinching. The automobile door 10 with the sheet metal part is attached to a holder 11. The holder 11 is mounted to the arm 12 of the robot 9.

Figure 3:
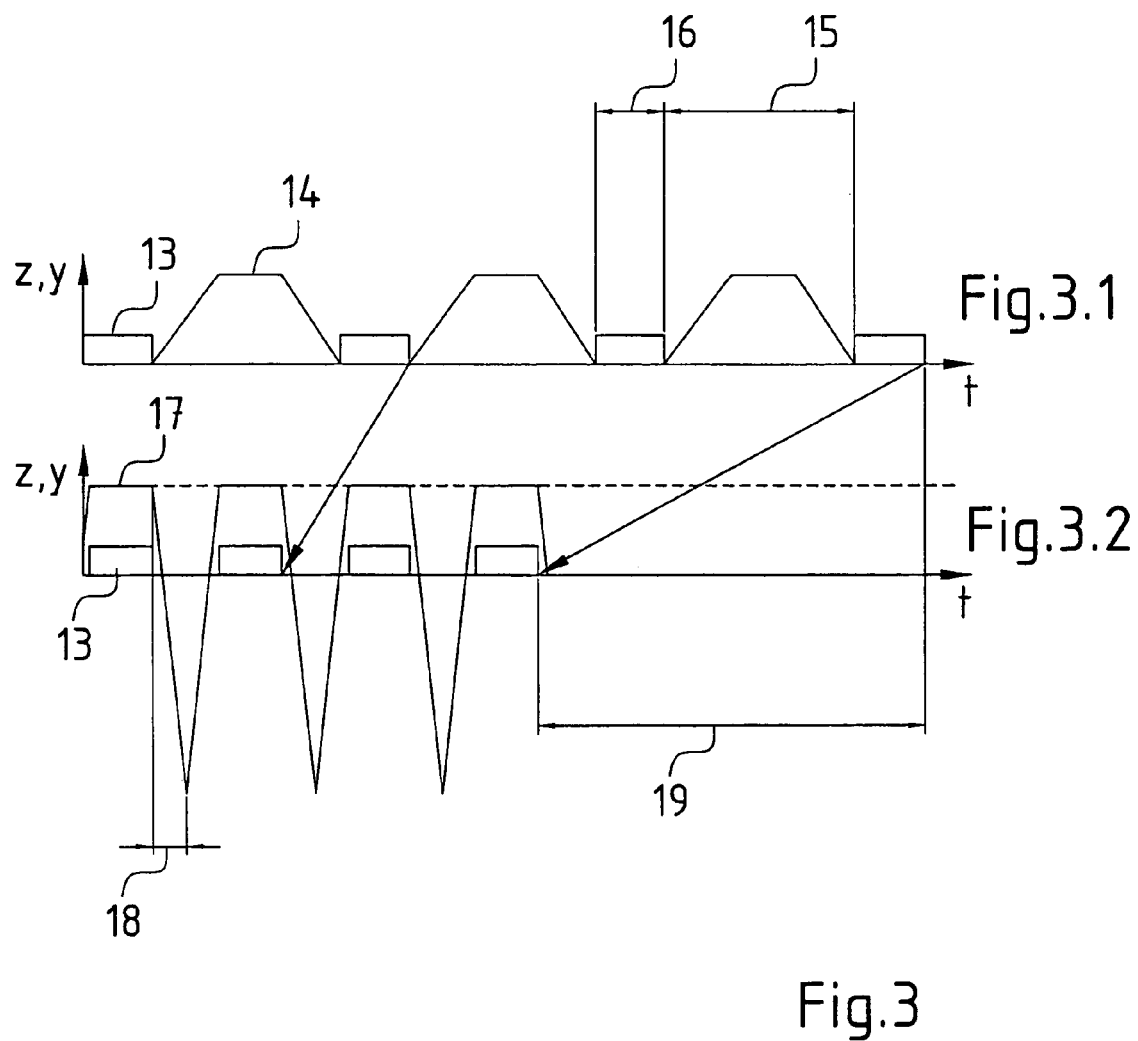
FIG. 3 distance-time curve for the movement of a workpiece and a tool.

With FIG. 3 the execution of the process according to the invention is explained.

FIG. 3.1 shows distance-time curves 13, 14 for the movement of the punch 1 in the z-direction and of the automobile door 10 in y-direction according to the state of the art. The movement 13 of the punch 1 for clinching and the movement 14 of the automobile door 10 by means of a robot 9 are sequential. The robot 9 does not move during the clinching of the automobile door 10. Punch 1 and die 2 remain fixed in the same position within the x-y-plane. The positioning time 15 of the automobile door 10 with the robot 9 from clinch spot to clinch spot is approximately three times the duration 16 for the actual clinching. The robot 9 performs start stop movements 14 with the automobile door 10. This kind of positioning of the automobile door 10 is time consuming and imprecise.

FIG. 3.2 shows distance-time curves 13, 17 for the movement of the punch 1 in the z-direction and of the punch 1 and the die 2 in y-direction according to the process according to the invention. The robot 9 moves the automobile door 10 continuously and with approximately constant speed through the location of the clinching. During clinching 13 punch 1 and die 2 are moved in +y-direction with the guiding elements 6 with the same speed and the same distance like the automobile door 10. The clinching process is static relative to the automobile door 10. Directly subsequent to the setting of a clinch spot the disengaged punch 1 and die 2 are quickly moved in the duration 18 in −y-direction for the next clinching process by means of the motor 6 and the gear elements 5, while the automobile door 10 is continuously moved by the robot 9.

Through the clinching during the continuous movement of the automobile door 10 as well as the punch 1 and die 2, non-productive secondary processing time is reduced. For the four clinch processes shown in FIG. 3.1 and 3.2 the resulting reduction of the joining process is the duration 19.

| Reference numeral list | |
|---|---|
| 1 | punch |
| 2 | die |
| 3 | carriage |
| 4 | motor |
| 5 | gear element |
| 6 | guiding element |
| 7 | controller |
| 8 | frame |
| 9 | robot |
| 10 | automobile door |
| 11 | holder |
| 12 | arm |
| 13, 14 | movement |
| 15 | positioning time |
| 16 | duration |
| 17 | movement |
| 18, 19 | duration |

I claim:

1. A method for controlling position of a workpiece (10) and a tool (1, 2) with a robot (9) in a manufacturing machine, comprising:
    positioning the workpiece (10) relative to the tool (1, 2),
    processing the workpiece with the tool during a continuous movement of the workpiece (10) at a processing location of the workpiece (10) in which the tool (1, 2) is moving during the processing synchronously to and in the same direction as the workpiece (10), and
    during the continuous movement of the workpiece (10), positioning the tool (1, 2) in another processing location.

2. The method according to claim 1, wherein the workpiece (10) is moved on an arm (12) of the robot (9) and wherein the tool (1, 2) is moved linearly back and forth with a separate drive (4, 5).

3. The method according to claim 1, wherein two workpieces (10) are moved together and joined by the tool (1, 2).

4. The method according to claim 1, wherein the workpiece (10) and the tool (1, 2) are positioned with different robots.

5. The method according to claim 1, wherein during the processing, workpiece (10) and tool (1, 2) are moved with constant velocity.

* * * * *